United States Patent
Colombo et al.

(10) Patent No.: US 10,845,498 B2
(45) Date of Patent: Nov. 24, 2020

(54) DRONE-BASED ELECTROMAGNETICS FOR EARLY DETECTION OF SHALLOW DRILLING HAZARDS

(71) Applicant: Saudi Arabian Oil Company, Dhahran (SA)

(72) Inventors: Daniele Colombo, Dhahran (SA); Ersan Turkoglu, Dhahran (SA); Gary W. McNeice, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 101 days.

(21) Appl. No.: 16/182,123

(22) Filed: Nov. 6, 2018

(65) Prior Publication Data
US 2020/0142090 A1    May 7, 2020

(51) Int. Cl.
*G01V 3/08* (2006.01)
*G01V 3/17* (2006.01)
(Continued)

(52) U.S. Cl.
CPC .............. *G01V 3/17* (2013.01); *B64C 39/024* (2013.01); *G01S 13/885* (2013.01);
(Continued)

(58) Field of Classification Search
CPC ........... G01V 3/17; G01S 13/88; G01S 13/89; G01S 13/885; G01S 13/865;
(Continued)

(56) References Cited

U.S. PATENT DOCUMENTS 4,492,924 A * 1/1985 Nilsson .................. G01V 3/165
324/330
5,266,799 A 11/1993 Steinitz et al.
(Continued)

FOREIGN PATENT DOCUMENTS

CN    107831548    3/2018
GB    2511908    9/2014
(Continued)

OTHER PUBLICATIONS

PCT International Search Report and Written Opinion in International Appln. No. PCT/US2019/059805, dated Mar. 6, 2020, 27 pages.
(Continued)

*Primary Examiner* — Thang X Le
(74) *Attorney, Agent, or Firm* — Fish & Richardson P.C.

(57) ABSTRACT

The subject matter of this specification can be embodied in, among other things, an unmanned aerial vehicle system includes a first loop airframe structure having a transmitter loop antenna and defining a plane, a second loop airframe structure having a receiver loop antenna having a diameter smaller than the transmitter loop antenna and oriented substantially parallel to the plane, a plurality of vertical thrusters configured to provide lift substantially perpendicular to the plane and elevate the system above a ground surface, at least one lateral thruster configured to provide thrust substantially parallel to the plane, a controller affixed configured to control the plurality of vertical thrusters and the lateral thruster, and an electromagnetic sensing system (such as ground-penetrating radar) configured to transmit electromagnetic signals using the transmitter loop antenna and receive secondary electromagnetic signals of secondary eddy currents caused by interactions between the EM signals and underground geological structures.

20 Claims, 10 Drawing Sheets

(51) Int. Cl.
*B64C 39/02* (2006.01)
*G01S 13/88* (2006.01)

(52) U.S. Cl.
CPC .. *B64C 2201/108* (2013.01); *B64C 2201/123* (2013.01); *B64C 2201/162* (2013.01)

(58) Field of Classification Search
CPC .... G01S 13/867; G01S 13/751; G01S 13/907; G01S 19/43; G01S 19/91
See application file for complete search history.

(56) References Cited

U.S. PATENT DOCUMENTS

| | | | |
|---|---|---|---|
| 7,157,914 B2 | 1/2007 | Morrison et al. | |
| 7,336,079 B2 | 2/2008 | Stolarczyk | |
| 9,645,237 B2 | 5/2017 | Stolarczyk | |
| 9,817,147 B2 | 11/2017 | Miles et al. | |
| 2001/0035836 A1* | 11/2001 | Miceli | G01S 13/89 342/22 |
| 2008/0125920 A1 | 5/2008 | Miles et al. | |
| 2008/0211506 A1* | 9/2008 | Klinkert | H01Q 1/30 324/330 |
| 2009/0284258 A1 | 11/2009 | Morrison et al. | |
| 2014/0012505 A1 | 1/2014 | Smith | |
| 2016/0131790 A1 | 5/2016 | Vowles | |
| 2016/0363685 A1* | 12/2016 | Giordana | B64D 3/00 |
| 2017/0123093 A1* | 5/2017 | West | G01V 3/17 |
| 2018/0038983 A1 | 2/2018 | Pai et al. | |
| 2018/0141682 A1 | 5/2018 | Blake et al. | |
| 2018/0229833 A1* | 8/2018 | Kimchi | B64C 25/10 |
| 2018/0342787 A1* | 11/2018 | McAllister | H01Q 11/08 |
| 2019/0154840 A1* | 5/2019 | Ferguson | H04W 16/26 |
| 2019/0341679 A1* | 11/2019 | Ozdemir | H01Q 21/24 |

FOREIGN PATENT DOCUMENTS

| | | | |
|---|---|---|---|
| KR | 20180036021 | | 4/2018 |
| RU | 2647221 | | 1/2010 |
| RU | 2656287 | * | 6/2018 |
| WO | 2014026275 | | 2/2014 |
| WO | 2015162493 | | 10/2015 |

OTHER PUBLICATIONS

Altdorff et al., "UAV-Borne Electromagnetic Induction and Ground-Penetrating Radar Measurements: A Feasibility Test," paper presented at the 74th Annual Meeting of the Deutsche Geophysikalische Gesellschaft, Mar. 9-13, 2014, 1 pages.

Arcone, "Dielectric constant and layer-thickness interpretation of helicopter-borne short-pulse radar waveforms reflected from wet and dry river-ice sheets," IEEE Transaction on Geoscience and Remote Sensing, vol. 29, Issue 5, Sep. 1991, 10 pages.

Gacitua et al., "50MHz helicopter-borne radar data for determining of glacier thermal regime in the central Chilean Andes," Annals of Glaciology, vol. 56, Issue 70, Jan. 2015, 9 pages.

Legault, "Airborne Electromagnetic Systems—State of the Art and Future Directions," CSEG Recorder, Jun. 2015, 12 pages.

Li and Ling, "Synthetic Aperture Radar Imaging Using a Small Consumer Drone," IEEE International Symposium on Antennas and Propagation & USNC/URSI National Radio Science Meeting, Jul. 19-24, 2015, 2 pages.

Rutishauser et al., "Helicopter-borne ground-penetrating radar investigations on temperate alpine glaciers: A comparison of different systems and their abilities for bedrock mapping," Geophysics vol. 81, Issue 1, Jan.-Feb. 2016, 12 pages.

* cited by examiner

DRONE-BASED ELECTROMAGNETICS FOR EARLY DETECTION OF SHALLOW DRILLING HAZARDS

TECHNICAL FIELD

This instant specification relates to unmanned aerial vehicles, more specifically unmanned aerial vehicles configured for sensing subterranean voids.

BACKGROUND

Shallow cavities represent hazards for drilling activities whether the wells are for water, oil exploration, shallow drilling for geophysical investigation or geotechnical work. A collapse of such buried cavities can cause disruption of operations, financial losses, and casualties. The size and the depth of such cavities can cause different threats depending on the infrastructure taken into consideration. For this reason, mitigation actions and studies to prevent and identify the underground cavities need to be tuned to the specific application.

Shallow drilling hazards are generally produced by cavities located in a range extending from just below the topographic surface (nominally zero meter depth) of the Earth to approximately 50 m depth. Cavities very close to the surface pose immediate threats to operators of drilling equipment, as the increased weight load due to machinery and well rig infrastructures can cause sudden collapses. Material damages and human casualties have been recorded on several occasions as a result of shallow collapses. Collapse of deeper cavities can also be triggered by circulation of drilling mud where dissolution and erosion of infill material (a phenomenon sometimes called "washout") can lead to the progressive opening of surface cavities. Based on drilling reports and driller's experience, the washout phenomenon is considered to be a possible occurrence up to 50 m depth, where for deeper levels the problem tends to cease to be a problem for surface collapse. Any proactive method to detect and prevent the occurrence of shallow drilling hazards or collapses should target the depth range between 0 meters (m) and at least 50 m.

SUMMARY

In general, this document describes unmanned aerial vehicles configured for sensing subterranean voids.

In a first aspect, an unmanned aerial vehicle (UAV) system includes a first loop airframe structure having a transmitter loop antenna and defining a plane, a second loop airframe structure having a receiver loop antenna having a diameter smaller than the transmitter loop antenna and oriented substantially (for example, +/−15 degrees) parallel to the plane, a plurality of vertical thrusters configured to provide lift substantially perpendicular (for example, +/−15 degrees) to the plane and elevate the system above a ground surface, at least one lateral thruster configured to provide thrust substantially parallel (for example, +/−15 degrees) to the plane, a controller affixed configured to control the plurality of vertical thrusters and the lateral thruster, and an electromagnetic (EM) sensing system configured to transmit EM signals using the transmitter loop antenna and receive secondary electromagnetic signals of secondary eddy currents caused by interactions between the EM signals and underground geological structures.

Various embodiments can include some, all, or none of the following features. The EM sensing system can be a time-domain and frequency-domain electromagnetic sensing system. The system can include a ground-penetrating radar (GPR) system configured to transmit radar signals directed toward the ground surface and receive radar signals reflected off underground geological structures. The transmitter loop antenna can have a diameter of at least 5 meters. The receiver loop antenna can have a diameter about as large as or smaller than a diameter of the transmitter loop antenna. The receiver loop antenna can include induction coils housed in the second loop airframe structure. The first loop airframe structure can be removable from a remainder of the system and the remainder of the system is configured to fly while disconnected from the first loop airframe structure. The first loop airframe structure can be a substantially circular airframe structure and the transmitter loop antenna is a substantially circular loop antenna. The EM sensing system can be configured to sense geological structures located at depths ranging from about 0 meters to at least 50 meters below the ground surface. The geological structures can be located at depths ranging from about 0 meters to at least 50 meters below the ground surface.

In a second aspect, a method of detecting subterranean formations includes positioning, by an unmanned aerial vehicle (UAV), an electromagnetic (EM) sensing system at a predetermined position above a ground surface, transmitting, by the EM sensing system, EM signals using a first loop airframe structure having a transmitter loop antenna and defining a plane, inducing, based on the transmitted EM signals, eddy currents in underground geological structures, receiving, by the EM sensing system using a receiver loop antenna of the UAV, secondary EM signals caused by the induced eddy currents, identifying, based on the received secondary EM signals one or more underground geological structures.

Various implementations can include some, all, or none of the following features. The UAV can include a first loop airframe structure having the transmitter loop antenna and defining a plane, a second loop airframe structure having the receiver loop antenna having a diameter smaller than the transmitter loop antenna and oriented substantially parallel to the plane, a collection of vertical thrusters configured to provide lift substantially perpendicular to the plane and elevate the system above the ground surface, at least one lateral thruster configured to provide thrust substantially parallel to the plane, a controller affixed configured to control the collection of vertical thrusters and the lateral thruster, and the EM sensing system. Positioning, by the unmanned aerial vehicle (UAV), the electromagnetic (EM) sensing system at the predetermined position above the ground surface can include elevating, by a collection of vertical thrusters, the UAV to a predetermined elevation above the ground surface, and positioning, by one or more lateral thrusters, the UAV to a predetermined lateral position above the ground surface. The method can include repositioning, by the UAV, the EM sensing system at a predetermined second position above the ground surface, transmitting, by the EM sensing system, second EM signals using the transmitter loop antenna, inducing, based on the transmitted second EM signals, second eddy currents in underground geological structures, receiving, by the EM sensing system using the receiver loop antenna, second secondary EM signals caused by the induced second eddy currents, and identifying, based on the received second secondary EM signals one or more underground geological structures. The method can include positioning, by the UAV, a ground-penetrating radar (GPR) system at the predetermined position above the ground surface, transmitting, by the GPR system, radar signals directed toward the ground surface, receiving, by the GPR system, radar signals reflected off underground geological structures, and identifying, based on the received radar signals, one or more underground geological structures. The transmitter loop antenna can have a diameter of at least 5 meters. The first loop airframe structure can be removable from a remainder of the UAV, and the remainder of the UAV is configured to fly while disconnected from the first loop airframe structure. The first loop airframe structure can be a substantially circular airframe structure and the transmitter loop antenna is a substantially circular loop antenna. The method can include identifying one or more underground geological structures as a subterranean void. The method can include identifying one or more ground surface construction locations based on the identified underground geological structures.

In a third aspect, a system for detecting subterranean formations includes a collection of unmanned aerial vehicles (UAVs), each UAV including a first loop airframe structure comprising a transmitter loop antenna and defining a plane, a second loop airframe structure comprising a receiver loop antenna having a diameter smaller than the transmitter loop antenna and oriented substantially parallel to the plane, a plurality of vertical thrusters configured to provide lift substantially perpendicular to the plane and elevate the system above a ground surface, at least one lateral thruster configured to provide thrust substantially parallel to the plane, a controller affixed configured to control the plurality of vertical thrusters and the lateral thruster, an electromagnetic (EM) sensing system configured to transmit EM (for example, radio frequency) signals using the transmitter loop antenna and receive secondary electromagnetic signals of secondary eddy currents caused by interactions between the EM signals and underground geological structures, and a transmitter configured to transmit signals representative of the received secondary electromagnetic signals, and a controller configured to coordinate movement and positioning of the plurality of UAVs within a predetermined area of the ground surface, and identify one or more underground geological structures based on secondary EM signals received by the collection of UAVs.

The systems and techniques described here may provide one or more of the following advantages. First, a system can detect shallow subterranean voids and cavities. Second, the system can be operated at lower cost with greater safety, efficiency, and accuracy than manned aerial ground surveillance systems. Third, the system can be operated in areas that are not accessible to ground-based (for example, wheeled or tracked) vehicles. Fourth, the system can perform ground surveys in a semi or fully autonomous manner. Fifth, the system can improve the safety of humans, equipment, and structures placed at ground level by identifying and avoiding potential underground dangers.

The details of one or more implementations are set forth in the accompanying drawings and the subsequent description. Other features and advantages will be apparent from the description and drawings, and from the claims.

DETAILED DESCRIPTION

This document describes systems and techniques for the early detection of cavities, applied to activities such as drilling for oil and gas exploration. Shallow drilling hazards are generally produced by cavities located in a range extending from just below the topographic surface (nominally zero meter depth) of the Earth to approximately 50 m depth. In order to detect and locate such cavities, a purpose-built unmanned aerial vehicle (UAV), or "drone" is equipped with ground penetrating radar (GPR) and electromagnetic (EM) induction based sensors, and is flown over the land to be surveyed in order to detect subterranean voids. The use of the purpose-built UAV permits the sensors to be positioned over many types of ground that would be inaccessible to wheeled or tracked vehicles. The use of the purpose-built UAV also allows the sensors to be flown safely at a low altitude to enable the use of smaller sensor antennas and lower power transceivers than are typically used with other (for example, airplane, helicopter) airborne sensors, and their relative proximity to the ground can provide higher resolutions than are provided by higher or larger airborne sensors.

Figure 1:
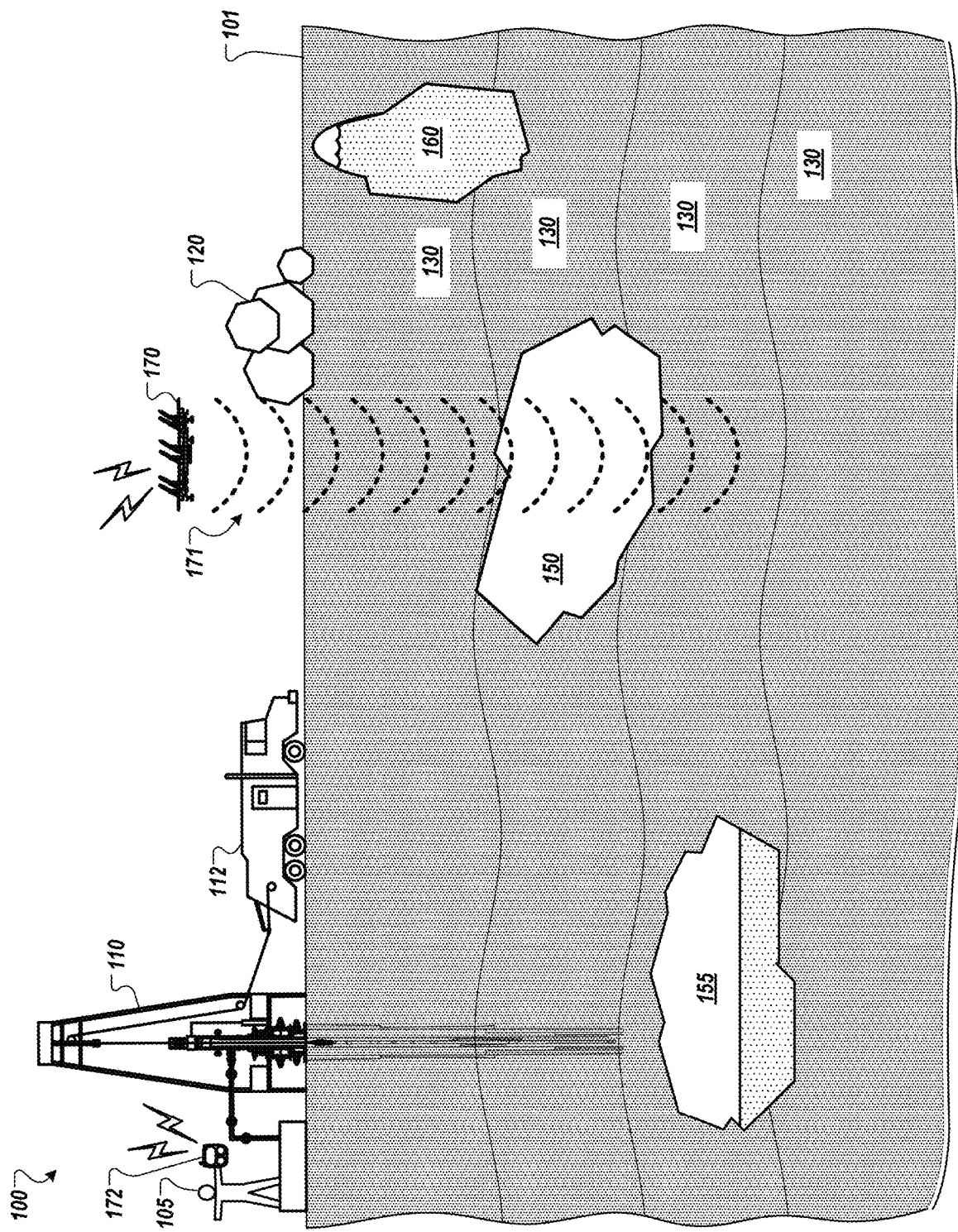
FIG. 1 is a conceptual sectional view of an example of a work zone with subterranean voids.

FIG. 1 is a conceptual sectional view of an example of a work zone 100 with subterranean voids. The work zone 100 extends across a portion of the Earth's surface 101. At the surface 101, surface activities occur, such as the construction and operation of a drilling rig 110 or related equipment, and the use of vehicular equipment 112. Some areas of the surface 101, such as a rock pile 120, are inaccessible by wheeled or tracked vehicles.

Below the surface 101 are various layers 130 of rock, soil, sand, and other geological materials. Formed within the various layers are a void 150, a void 160, and a void 155. The voids 150, 160, and 155 exist in a range of 0 m to about 50 m below the surface 101. In the illustrated example, the void 150 is substantially empty (for example, a cave, a sinkhole) and the void 160 is substantially filled (for example, water or sand). In either case, the voids 150, 160, and 155 are close enough to the surface 101 to pose a hidden danger to the operations at the surface 101. For example, the weight of the vehicle 112 could cause the voids 150, 160, and 155 to collapse underneath it, causing possible human injury or death and equipment damage or loss.

In the illustrated example, in order to detect and locate the voids 150, 160, and 155 (for example, to avoid them), an unmanned aerial vehicle (UAV) 170 is used. An operator 105 uses a remote controller 172 to pilot the UAV 170 remotely. In some embodiments, the UAV is at least partly autonomous. For example, the UAV 170 may be configured to hold an aerial position automatically, navigate to predetermined waypoint automatically, return to a "home" location automatically, or perform other autonomous or semi-autonomous operations. In some embodiments, the UAV 170 may be substantially fully autonomous. For example, the operator 105 may use a computer or other user interface device to configure the UAV 170, and the UAV 170 may carry out a site survey substantially on its own based on the configuration.

The UAV is purpose built, as will be discussed further in the descriptions of FIGS. 2-5, to sense geological structures below the surface 101, such as the layers 130 and the voids 150, 160, and 155. The UAV 170 is equipped with two or more types of geological sensor systems, including a ground-penetrating radar (GPR) system and an electromagnetic induction (EM) system. In general, GPR and EM sensor systems emit EM signals, as represented by waves 171, to detect different types of subterranean structures (for example, filled and hollow voids) at different depths (for example, from about 0 m to about 50 m), and their capabilities can complement each other in a combined output that can be used to sense voids and other underground structures.

In the illustrated example, the UAV 170 is able to traverse ground that would be inaccessible to a wheeled sensor transport. For example, the UAV 170 can fly and hover over the rock pile 120. The UAV 170 can also carry the sensors at elevations that would be unsafe or not practical for manned aerial vehicles. For example, the UAV 170 can be flown lower than the height of the drilling rig 110. As such, the entire work zone 100 is accessible to be surveyed, and the sensors can be kept close enough to the surface 101 to perform surveys of the subterranean depths of interest (for example, at least 50 m deep) with sufficient resolution to detect the voids 150, 160, and 155.

In some implementations, such an airborne design can also allow for repeated (for example, time-lapse) surveys to be carried out, even on rugged terrain, for monitoring purposes. Automated data analysis methods such as pattern recognition using neural networks for the expected diffraction signals from the karst can be used for real-time data interpretation without advanced data processing (for example, deconvolution, migration).

Figure 2:
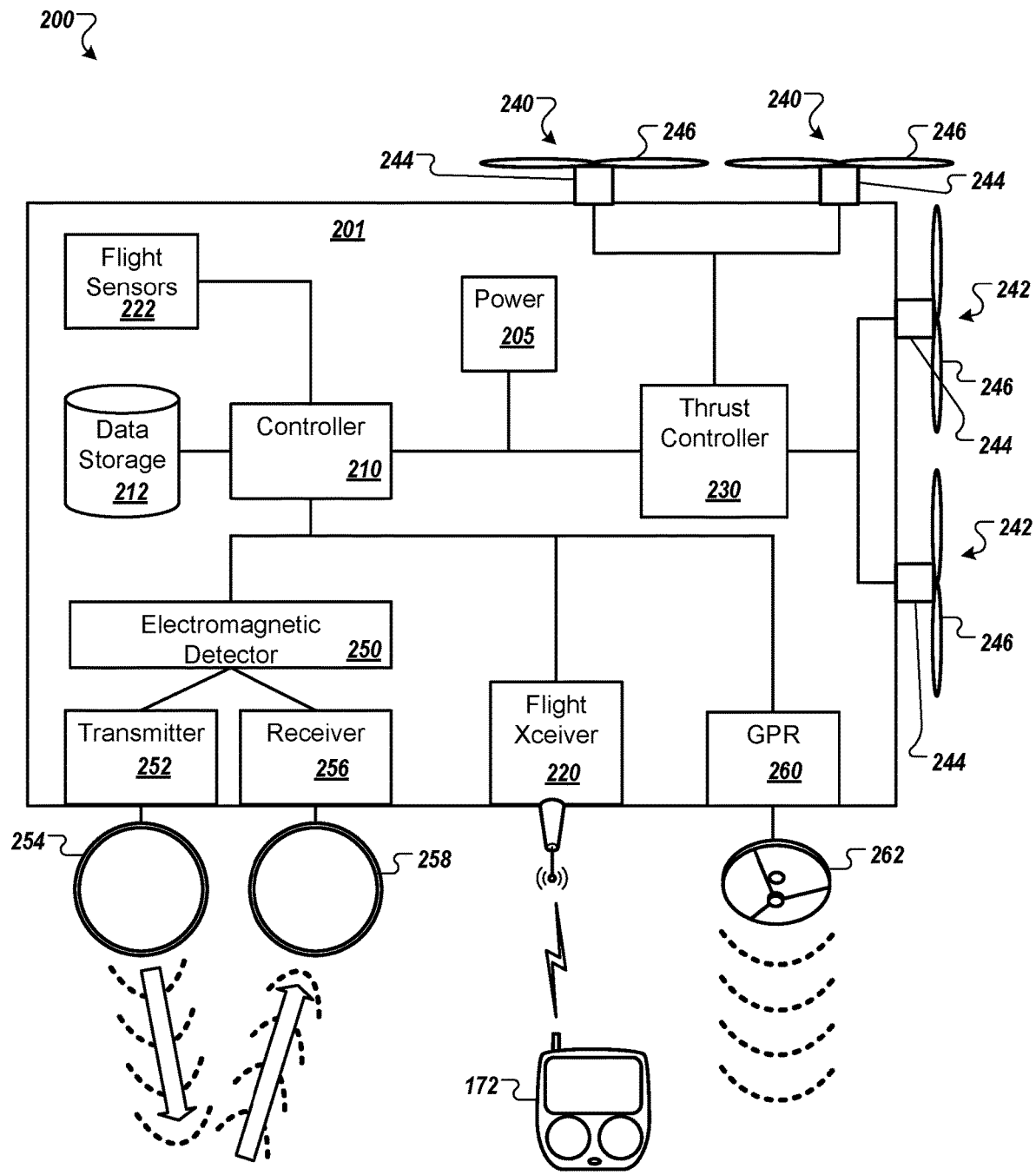
FIG. 2 is a block diagram that shows an example unmanned aerial vehicle.

FIG. 2 is a block diagram that shows an example unmanned aerial vehicle (UAV) system 200. The UAV system 200 includes a UAV 201. In some embodiments, the UAV 201 can be the example UAV 170 of FIG. 1.

The UAV 201 is powered by a power system 205 (for example, a battery, fuel cell). A controller 210 is configured to control the operations of the UAV 201 autonomously or semi-autonomously based on computer instructions tangibly embodied in a data storage system 212. The controller 210 can receive flight inputs from the example remote controller 172 of FIG. 1. Remote control signals and instructions are received at a flight transceiver 220 in communication with the controller 210. The controller 210 also receives flight sensor information from a collection of flight sensors 222. The flight sensors 222 can include local or global positioning systems (for example, Global Positioning System (GPS), Globalnaya Navigazionnaya Sputnikovaya Sistema (GLONASS)), compasses, roll/pitch sensors, accelerometers, radar, LIDAR, laser or ultrasonic rangefinders, or any other appropriate sensor that can be used for flight operations.

The UAV 201 uses the flight inputs from the flight transceiver 220 and the flight sensors 222 to control a thrust controller 230. The thrust controller 230 is configured to take instructions from the controller 210 and power from the power system 205 to control a collection of vertical thrusters 240 and a collection of horizontal thrusters 242. Each of the vertical thrusters 240 and the horizontal thrusters 242 includes an electric motor 244 and a propeller 246. The inclusion of both vertical thrusters 240 and horizontal thrusters 242 will be discussed further in the descriptions of FIGS. 3A-7. Although the vertical thrusters 240 and the horizontal thrusters 242 are described as using combinations of the electric motors 244 and propellers 246, in some embodiments other types of thrusters or lifters can be used (for example, liquid fuel engines, jet turbines, chemical rockets, pressurized gasses). Although the UAV 201 is described as a heavier-than-air vehicle, in some embodiments the UAV can be configured as a lighter-than-air vehicle (for example, a remotely operated helium-filled dirigible). In general, in various embodiments, any appropriate form of flight apparatus that can elevate and position the subterranean sensing equipment can be used.

The UAV 201 includes an EM sensing system 250 and a GPR system 260. The EM sensing system includes a transmitter 252 and a loop antenna 254 to emit EM signals that can induce eddy currents in subterranean materials (for example, rocks, soil). The EM sensing system includes a receiver 256 and a loop antenna 258 to receive EM signals caused by the induced eddy currents. The GPR system uses an antenna 262 to broadcast directed EM pulses into the ground and collect EM signals that are reflected off underground structures.

In general, GPR uses high frequency radio waves propagating through subsurface materials. Bistatic GPR systems typically transmit short electromagnetic pulses with a predetermined central frequency in MHz range via a transmitter antenna into the ground. Rapid changes in dielectric properties of the subsurface cause reflections of the electromagnetic signal, which are detected at a receiver antenna and recorded by the GPR 260 or the controller 210 as a function of time. Electromagnetic waves propagate with approximately the speed of light in vacuum. The velocity of radar waves in ground/soil is slower than speed of light, and for most geologic materials is inversely proportional to the square root of the dielectric constant. Recorded reflections and their amplitudes are used to create electromagnetic models of the layers 130 and the voids 150, 160, and 155. Due to the relatively short wavelengths typically used for GPR, GPR is considered as a high resolution imaging tool for variety of geophysical, environmental and geotechnical problems such as glacier monitoring, ice thickness and condition, archaeology, concrete and asphalt testing, contamination, karst detection, water table investigation etc. Penetration depth of electromagnetic waves depend on the frequency (for example, low frequencies can penetrate deeper at the expense of reduced resolution) used and the resistivity of the environment. A limiting factor of GPR is the rapid attenuation in low resistivity environment such as clay, saltwater, and metallic ores. Therefore, selection of antenna frequency and target resolution are variables that can affect GPR surveys.

The tradeoff between resolution and penetration depth can be eased with recently developed broadband pulse antennas, swept frequency-modulated continuous wave, or stepped frequency systems. These systems generally use a single set of antennae but are able to employ several central frequencies to improve resolution and penetration depth. Recently developed, air coupled, broadband monostatic (for example, single antenna for transmitter and receiver) GPR antennas such as the antenna 262 can be used for UAV-mounted GPR for shallow drilling hazard identification. A frequency band of about 20 MHz to about 200 MHz can be used to penetrate as deep as about 20 m and can provide adequate resolution for the detection of small or shallow cavities.

Electromagnetic (EM) methods have been used for mining, environmental, geothermal, oil and gas exploration and crustal studies. Active (for example, man-made) and passive (for example, natural) source EM methods as well as frequency and time domain systems exist to choose from according to the problem. Both frequency-domain and time-domain systems are based on EM induction theory. The Ampere's Law states that an electric current produces an associated magnetic field with an amplitude proportional to the current amplitude. Changing a magnetic field produces an electric field, and the strength of the electric field is proportional to the rate of change of the magnetic field (for example, Faraday's Law). Therefore, an alternating source current and the loop antenna 254 are used to create an alternating magnetic field to initiate eddy currents in the layers 130, which is an electrically conductive medium. Secondary magnetic fields are generated by the eddy currents and can be sensed to determine the electrical resistivity of the medium. Secondary magnetic fields are received at the loop antenna 258, detected and recorded by the receiver 256. The penetration depth of the EM energy is reduced by the increasing frequency and electrical conductivity of the subsurface.

Frequency-domain EM (FEM) systems generally use a constant frequency to perform sensing operations. Therefore, multiple frequency surveys are generally performed in order to sense shallow and deep electrical resistivity structures. On the other hand, time-domain EM (TEM) systems measure secondary EM field magnitudes that remain after a primary EM field is turned off. This approach is based on the fact that the eddy currents decay slowly in low resistivity environment and the decay is faster in high resistivity environment. This approach avoids the removal of the primary fields in the processing, and produces a wide range of frequencies depending on the ramp time and the initial transmitter current waveform and duration.

Many land and airborne (for example, fixed wing and helicopter based) FEM and TEM systems are available commercially. The design of these systems, however, are typically for relatively high flight altitude (for example, 30-130 m) so they need to employ massive primary fields via large, heavy, and high-powered multi-turn antenna coils in order to penetrate several hundreds of meters of Earth. The footprint of the system is also increased with the flight height and the transmitter loop size. Therefore, existing airborne EM systems do not provide high-resolution, near-surface EM imaging for drilling hazard investigation. Due to the relatively light weight and high responsiveness of UAVs, UAVs can fly a few meters above the surface 101, which reduces the need for massive primary field magnitudes to create required induction. Lower currents on the transmitter loop can be terminated sharply to generate high and broad frequency content. By reducing the size of the transmitter loop (for example, about 5 m-10 m diameter), the system 200 can provide higher vertical and horizontal resolutions than are generally available from manned-aircraft-based solutions In some embodiments, the flight sensors 222 can include global and local positioning system (for example, GPS), laser or sonic range sensors, light detection and ranging (LIDAR) systems, machine vision systems, or any other appropriate flight control and obstacle avoidance sensors. For example, information provided by onboard GPS, GPR, laser or LIDAR of the UAV 201 can be used by the controller 210 to perform for autonomous and crash-protected surveying with predefined waypoints, paths, and flight altitudes.

Figure 3A:
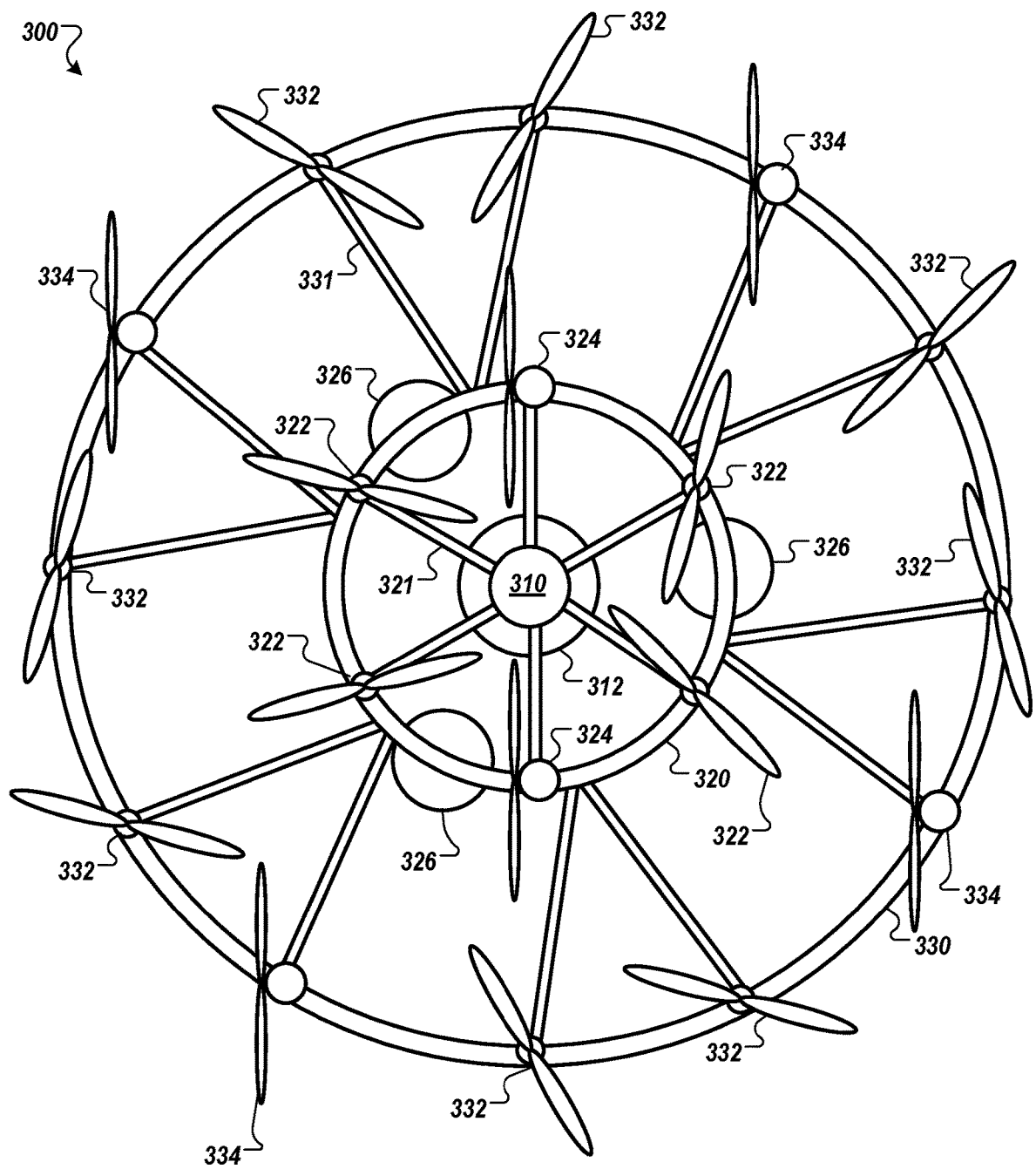
FIG. 3A is a top view of an example unmanned aerial vehicle.
Figure 3B:
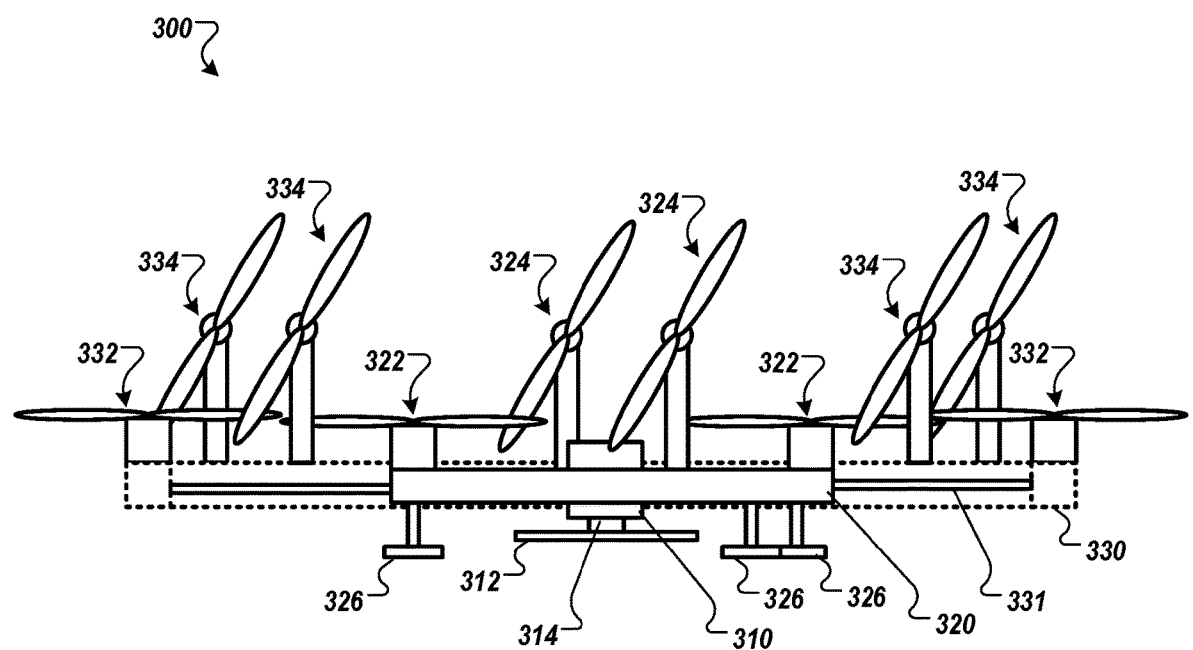
FIG. 3B is a side view of an example unmanned aerial vehicle.

FIG. 3A is a top view of an example unmanned aerial vehicle 300. FIG. 3B is a side view of the example unmanned aerial vehicle 300. In some embodiments, the UAV 300 can be the example UAV 170 of FIG. 1 or the example UAV 201 of FIG. 2.

The UAV 300 is a purpose-built aircraft for performing EM and GPR surveys. The UAV 300 is configured to incorporate elements of the sensing systems as parts of its airframe. The UAV 300 includes three interconnected sections, including a central hub 310, an inner airframe 320, and an outer airframe 330. The central hub 310 includes flight control and power systems for the UAV 300. For example, the central hub 310 can include the example power system 205, the example controller 210, the data storage system 212, the example flight transceiver 220, the example flight sensors 222, the example thrust controller 230, the example EM detector 250, the GPR 260, or other appropriate systems.

A GPR antenna 312 is affixed to the central hub 310 and is in communication with a GPR system of the UAV 300. In some embodiments, the GPR antenna 312 is mounted upon a gimbal system 314 (visible in FIG. 3B) that can aim the GPR antenna 312 independently from the overall orientation of the UAV 300. For example, the gimbal can be used to keep the GPR antenna 312 in a stable alignment with the surface 101 as the UAV 300 is buffeted by winds aloft.

The inner airframe 320 is a generally circular structure. The circular structure of the inner airframe 320 houses a receiver loop antenna coil (for example, the loop antenna 258) of an EM sensor system (for example, the EM detector 250). The inner airframe 320 is affixed to the central hub 310 by a collection of lightweight struts 321. The inner airframe 320 also supports a collection of vertical thrusters 322, a collection of horizontal thrusters 324, and a collection of landing feet 326. The landing feet 326 are configured to protect various parts of the UAV 300 during landing and takeoff. For example, the landing feet 326 can be configured to absorb the impact of a rough landing. In some embodiments, the inner airframe 320 and the loop antenna coil can be from about 2.5 m to about 5 m in diameter.

In some implementations, EM receiver coil(s) can be located in the central hub 310, isolated from the possible vibrations of the engines/frame and supported by the gimbal system 314 or added stability and orientation control. The outer airframe can form part of the frame of the UAV 300 and the transmitter loop, the inner airframe 320 can be used for structural stability and rigidity. In the illustrated example, the inner airframe 320 is also be the receiver loop.

The outer airframe 330 is a generally circular structure. The circular structure of the outer airframe 330 houses a transmitter loop antenna coil (for example, the loop antenna 254) of an EM sensor system (for example, the EM detector 250). The outer airframe 330 is affixed to the inner airframe 320 by a collection of lightweight struts 331. The outer airframe 330 also supports a collection of vertical thrusters 332, a collection of horizontal thrusters 334. The outer airframe 330 and its loop antenna coil have a diameter approximately twice that of the inner airframe 320. In some embodiments, the outer airframe 330 and its loop antenna coil can be from about 5 m to about 10 m in diameter.

In general, the loop antennas used for the UAV 300 can be relatively much smaller than their counterparts that are used with traditional (for example, manually piloted) aircraft because traditional aircraft are flown at relatively much higher altitudes than the UAV 300 (for example, for safety reasons). Relatively higher altitude operations generally require relatively higher-powered transceivers and larger antennas, whereas lower altitude operations can be performed with relatively smaller antennas or lower-powered transceivers. Smaller, lower-altitude EM systems such as the ones included in the UAV 300 can also provide relatively better survey resolution than their higher-flying counterparts since the small size of the transceiver is able to sense relatively smaller vertical sections of the Earth and UAV 300 can be moved across the surface 101 more slowly and with relatively greater precision and stability than can typically be accomplished larger aircraft.

The typical UAVs generally include either vertical thrusters (for example, vertical-takeoff aircraft) or horizontal thrusters (for example, fixed-wing aircraft), but not both. By contrast, however, the UAV 300 includes both vertical thrusters 322, 332 and horizontal thrusters 324, 334. The use of both vertical and horizontal thrusters enhances the surveying capabilities of the UAV 300.

For example, if the EM detector system 250 and the GPR system 260 were used in a fixed wing configuration with horizontal thrusters only, then a minimum airspeed would generally be required in order to keep the aircraft aloft. The altitude of such a fixed-wing craft can also be relatively less stable than that of a rotorcraft, as winds and up/downdrafts can affect the lift and altitude of the craft as it flies. Such speeds and buffeting would reduce the resolution by which the ground could be surveyed without requiring repeated passes. In another example, if the EM detector system 250 and the GPR system 260 were used in a typical drone configuration with horizontal thrusters only, then the horizontal position of the craft would be maintained and altered by tilting the entire airframe in the desired direction. Such tilting, however, adversely affects the alignment of the EM detector system 250 and the GPR system 260, and degrades the resolution by which the ground can be surveyed. Changes to the tilt of the drone can alter the primary magnetic field created by the horizontal loop of the drone frame. Therefore, the UAV 300 has lateral thrusters (or tiltrotors) synchronized with the vertical thrusters to maintain a laterally moving, horizontal loop geometry.

By using the vertical thrusters 322, 332 and the horizontal thrusters 324, 334, the task of moving and keeping the UAV 300 stable can be divided. The vertical thrusters 322 and 332 can be used to keep the UAV 300 level at a predetermined altitude, and the horizontal thrusters can be used to spin the UAV 300 and propel the UAV 300 horizontally.

In some embodiments, the horizontal thrusters 324, 334 can be oriented in fixed orientations. For example, the horizontal thrusters 324, 334 can all be oriented in the same direction, and power to the horizontal thrusters 324, 334 can be varied in a form of differential steering in order to move the UAV 300 horizontally or to maintain a fixed position against a prevailing wind. In another example, the horizontal thrusters 324, 334 can be oriented in different directions (for example, left, right, fore, and rear), and power to the appropriate horizontal thrusters 324, 334 can be controlled to perform horizontal (for example, forward, backward, left, right, spin) movements.

In some embodiments, the horizontal thrusters 324, 334 can be affixed to the rest of the UAV 300 by controllable pivot points. For example, the horizontal thrusters 324, 334 can be rotated to direct their thrust in a predetermined direction to urge horizontal movement of the UAV 300.

Figure 4A:
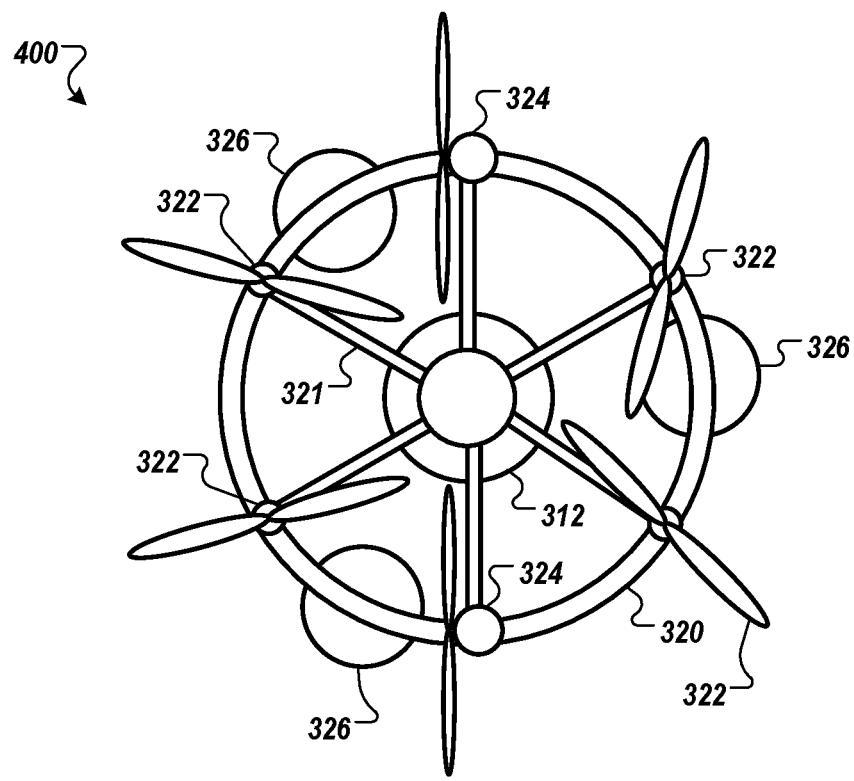
FIG. 4A is a top view of an example submodule of an unmanned aerial vehicle.
Figure 4B:
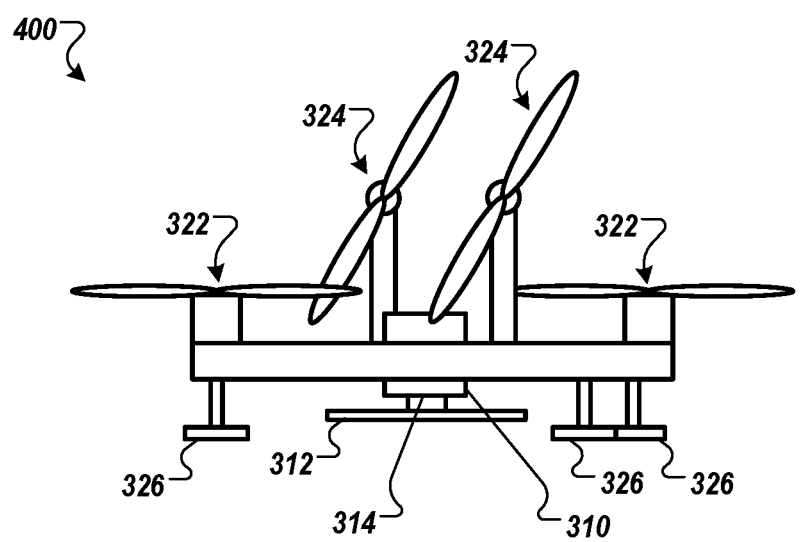
FIG. 4B is a side view of an example submodule of an unmanned aerial vehicle.

FIG. 4A is a top view of an example submodule 400 of an unmanned aerial vehicle. FIG. 4B is a side view of the example submodule 400 of an unmanned aerial vehicle. In some embodiments, the submodule 400 can be a sub-portion of the example UAV 170 of FIG. 1 or the example UAV 300 of FIGS. 3A and 3B. Generally speaking, in some embodiments, the UAV 300 can be constructed with a modular design in which a sub-portion of the UAV 300 is detachable from the UAV 300 yet still operable as a UAV with at least some of the survey functionality of the UAV 300, and perhaps with increased flight times due to reduced size and weight.

In the illustrated example, the submodule 400 includes the central hub 310, the GPR antenna 312 affixed to the central hub 310, the gimbal system 314 (visible in FIG. 4B) and the inner airframe 320. As described previously, the inner airframe is a generally circular structure that houses a receiver loop antenna coil (for example, the loop antenna 258) of an EM sensor system (for example, the EM detector 250). The inner airframe 320 is affixed to the central hub 310 by the collection of lightweight struts 321. The inner airframe 320 also supports the collection of vertical thrusters 322, the collection of horizontal thrusters 324, and the collection of landing feet 326.

Figure 5:
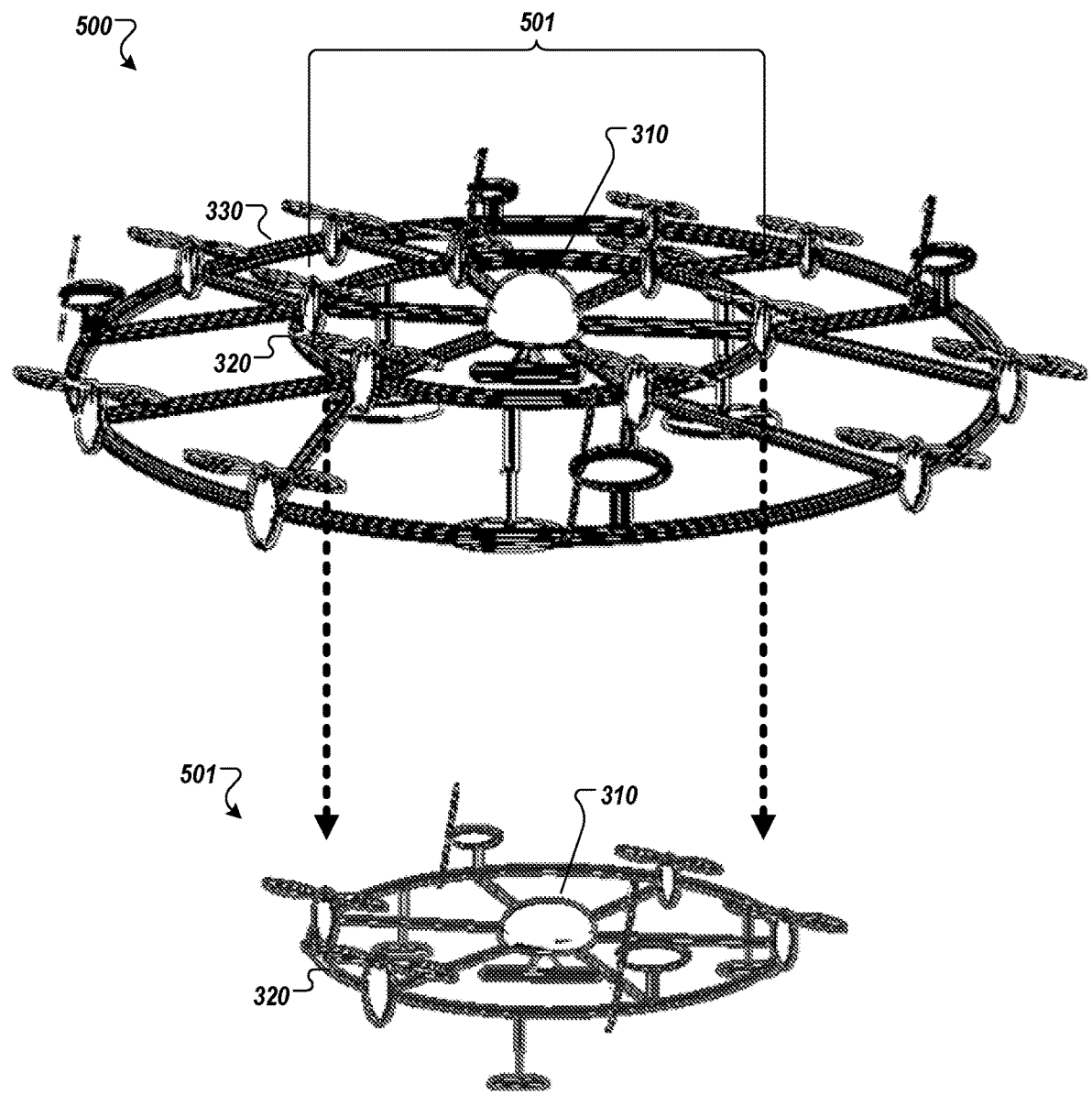
FIG. 5 is a perspective view of an example unmanned aerial vehicle and submodule.

FIG. 5 is a perspective view of an example unmanned aerial vehicle 500 and submodule 501. In some embodiments, the UAV 500 can be the example UAV 170 of FIG. 1 or the example UAV 300 of FIGS. 3A and 3B. In some embodiments, the submodule 501 can be the example submodule 400 of FIGS. 4A and 4B. The illustrated example is provided to show an example of the relationship between a UAV in a "full" configuration, for example, the UAV 500, and an independently operable submodule, for example, the submodule 501.

In an assembled configuration, the UAV 500 includes both the outer airframe 330 that includes a loop antenna, and the inner airframe 320 that includes another loop antenna. Both of the airframes 320, 330 are in electrical communication with the central hub 310 to receive power, motor control signals, and EM transmission signals, and provide feedback information and received EM signals. As such, the UAV 500 includes both a transmitter antenna and a receiver antenna for EM sensing operations.

In a separated configuration, the submodule 501 can be detached mechanically and electrically from the remainder of the UAV 500. As such, the UAV includes the smaller of the two loop antennas. In this configuration, the submodule may be flown through smaller spaces and with longer flight times due to its reduced size and weight.

EM sensing operations are still possible in the separated configuration, despite the submodule 501 having only a single loop antenna onboard for that purpose. In some implementations, a second loop antenna can be placed within the area to be surveyed to act as a transmitter or receiver, while the inner airframe 320 can be used as its mate. For example, an EM transmitter and loop antenna can be placed at a stationary (for example, manually placed) or mobile (for example, on a land vehicle or a second UAV) position, and the submodule 501 can be used as the EM receiver to sense subterranean eddy currents caused by the EM transmission. In a similar arrangement, the submodule 501 can act as a moveable EM transmitter, and a physically separate EM receiver system can be used to detect underground eddy currents induced by the submodule 501.

Figure 6:
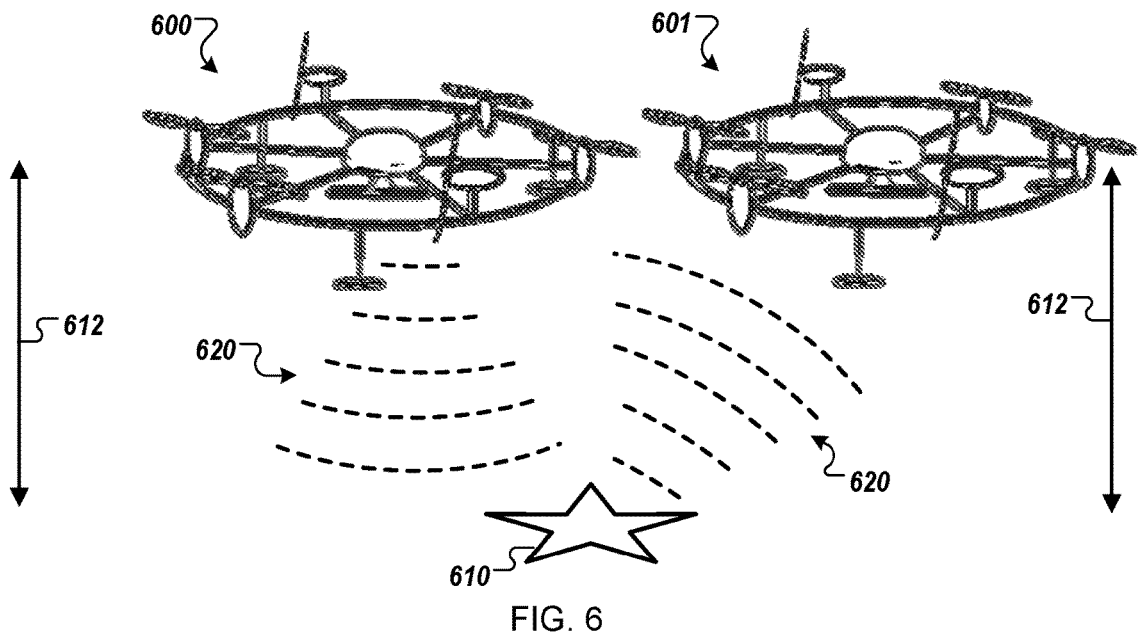
FIG. 6 is a conceptual diagram of example operation of the submodule drones as transmitter and receiver couple.

FIG. 6 is a conceptual diagram of example operation of a submodule 600 and a submodule 601 of unmanned aerial vehicles. The submodule 600 and the submodule 601 are configured as transmitter and receiver pair. In some embodiments, the submodule 600 and the submodule 601 can be examples of the UAV 170 of FIG. 1, the example UAV 201 of FIG. 2, the example UAV 300 of FIGS. 3A-5, or the example submodules 400 of FIGS. 4A and 4B, or the example submodule 501 of FIG. 5.

Referring to FIG. 6, the submodules 600 and 601 can be flown to a predetermined location 610 at a predetermined altitude 612. The ground and structures below the surface at the location 610 can be surveyed using GRP, EM, or combinations of these and other appropriate geological imaging techniques (represented by waves 620). In the illustrated example, the submodule 600 is configured as a GRP or EM transmitter, and the submodule 601 is configured as a GRP or EM receiver, to receive signals returned from the location 610.

Figure 7:
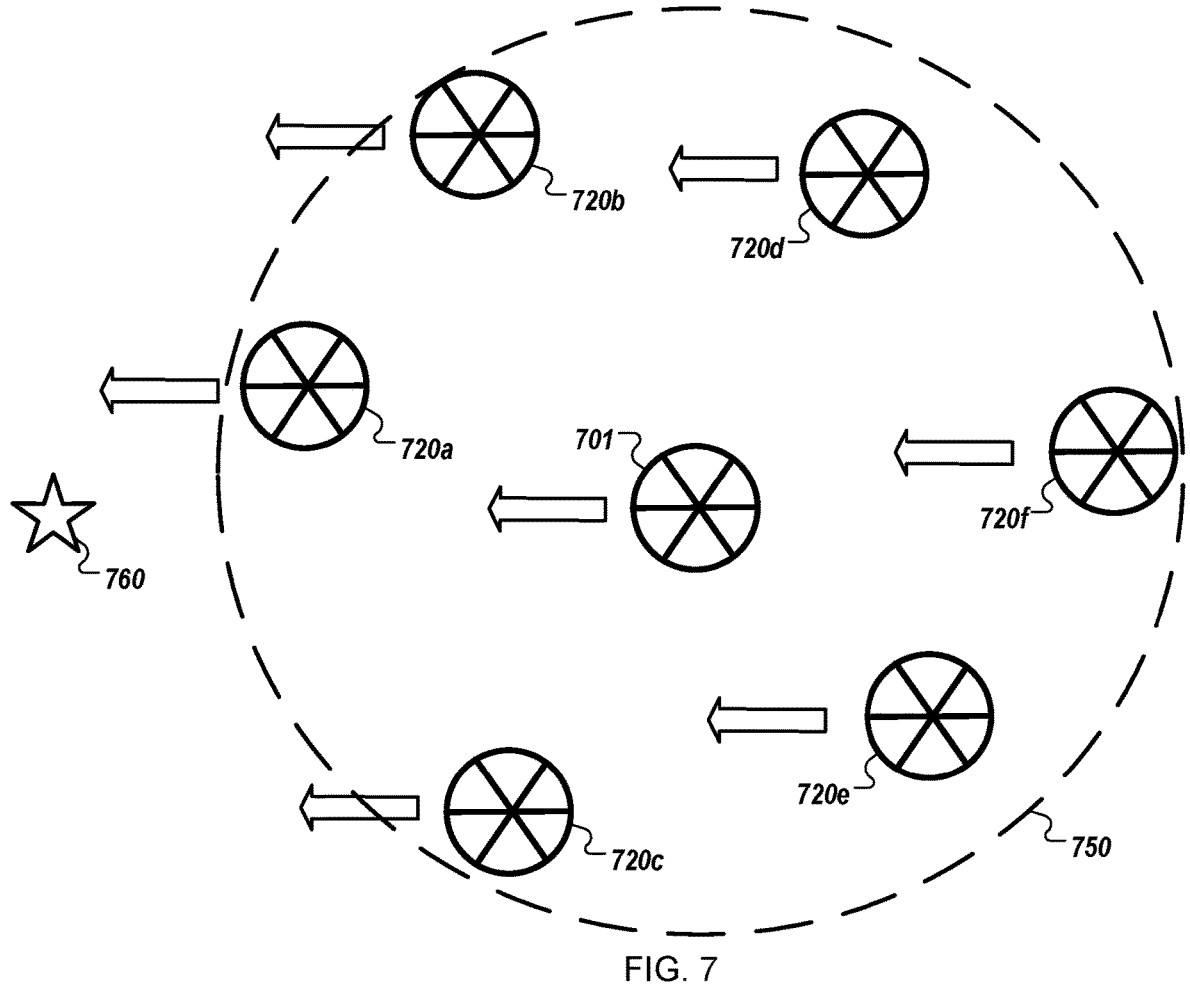
FIG. 7 is a conceptual diagram of example operation of submodule drones as multiple receivers around a single transmitter drone.

FIG. 7 is a conceptual diagram of example operation of submodule drones as multiple receivers around a single transmitter drone. The unmanned aerial vehicle survey system includes a transmitter UAV 701. A collection of receiver UAVs 720a, 720b, 720c, 720d, 720e, and 720f UAVs are configured as receiver loops. The number and locations of the receiver UAVs 720a-720f can be adjusted based on target specifications including size, depth, and structural complexity. In some embodiments, the receiver UAVs 720a-720f and the transmitter UAV 701 can be the example UAV 170 of FIG. 1, the example UAV 201 of FIG. 2, the example UAV 300 of FIGS. 3A-5, or the example submodules 400 of FIGS. 4A and 4B, the example submodule 501 of FIG. 5, or the example UAV 600 of FIG. 6. In the illustrated example, the receiver UAVs 720a-720f are used as one half of an EM sensor system having a transmitter and a receiver. In this example, the receiver UAVs 720a-720f will be described as performing the actions of an EM receiver. The transmitter UAV 701 is used as the other half of the EM sensor system. In some examples, however, the roles can be reversed (for example, the transmitter UAV 701 can be a receiver instead).

In the illustrated example, the transmitter UAV 701 includes a transmitter system and a transmitter antenna, such as a loop antenna. The receiver UAVs 720a-720f are flown with the transmitter UAV 701 as a synchronized group to a first predetermined location 750 to receive EM signals from eddy currents induced by transmissions from the transmitter UAV 701. The receiver UAVs 720a-720f can also use GPR and other sensors at the location 750. Information about the location 750, such as sensed underground structures is received by the receiver UAVs 720a-720f, is added to a collection of such survey information that may reside aboard the receiver UAVs 720a-720f, the transmitter UAV 701, or at a remote data receiving station (for example, a field laptop computer, tablet computer, smartphone).

The receiver UAVs 720a-720f and the transmitter UAV 701 are then flown to a second predetermined location 760 to perform additional survey operations. The receiver UAVs 720a-720f can also use GPR and other sensors at the second location 760. Information about the second location 760, such as sensed underground structures, is received by the receiver UAVs 720a-720f, is added to the collection of such survey information.

The receiver UAVs 720a-720f and the transmitter UAV 701 move to various additional predetermined locations to obtain a collection of measurements to generate a three-dimensional (XYZ) model of structures under the surveyed area. Such models can then be observed and explored by human personnel at a location safely away from the possible collapse underground voids.

In some implementations, the UAVs 701 and 720a-720f can be humanly piloted from a remote position. In some implementations, the UAVs 701 and 720a-720f can be operated autonomously. For example, the UAV 701 can be pre-programmed to fly from the predetermined location 750 to the predetermined location 760 on its own, followed automatically by the receiver UAVs 720a-720f. In another example, the UAVs 701, 720a-720f may determine at least some of the locations 750, 760, or others on their own, such as by detecting evidence of an underground void at a location and then automatically identifying one or more additional nearby locations to survey in order to increase the amount of sensed detail around an identified or suspected void or other structure.

Figure 8:
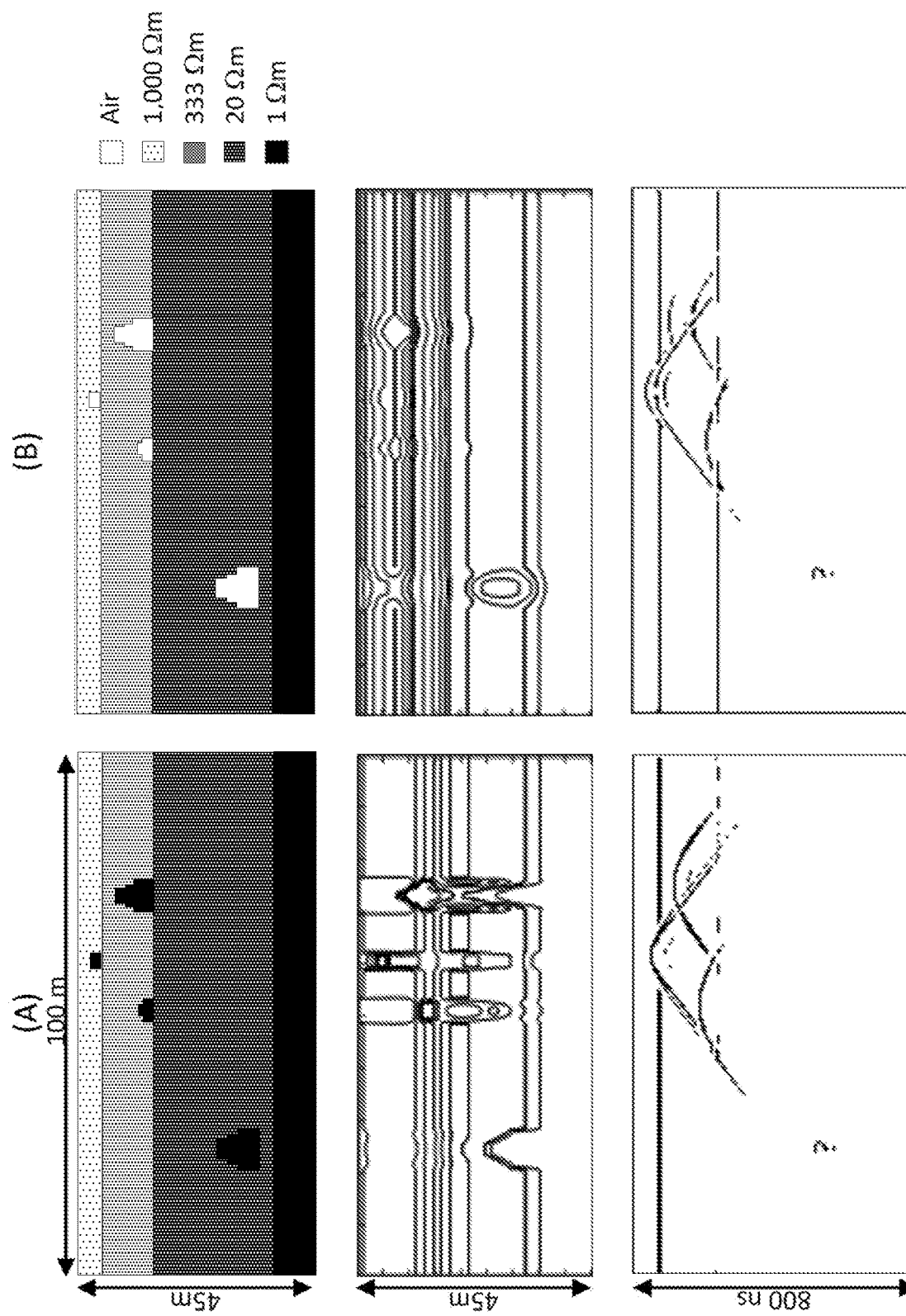
FIG. 8 shows examples of simulated subterranean structure detections.

An EM simulation was performed to observe the sensitivity and resolution of GPR and time domain electromagnetic methods. Two different scenarios of empty and filled cavities were simulated. FIG. 8 shows the simulation results for both scenarios.

The first case has four low resistivity material filled cavities of various sizes and depths, as illustrated in side (A). The second case has the same targets with high resistivity representing empty cavities, as illustrated in side (B). The simulated anomalies were embedded in a layered earth with given resistivity and dielectric constant values as shown in Table 1.

| | 1 | 2 | 3 | 4 | 5 (A/B) |
|---|---|---|---|---|---|
| Resistivity ($\Omega$m) | 1000 | 333 | 20 | 1 | 1/Air |
| Dielectric constant | 3 | 6 | 10 | 10 | 10/1 |

Time domain electromagnetic data were generated from both of these scenarios via forward modeling, and standard blind inversions (inversions initial model is 50 ohm-m ($\Omega$m) half-space) were applied to recover the earth model. Low resistivity anomalies create a response enough to image very shallow and deep anomalies of different sizes for case (A). However, high resistivity anomalies are merely detected (middle row). The deep low resistivity layer was well resolved in both cases.

GPR simulations used 50 MHz antenna frequency with zero offset configuration. Bottom row in FIG. 8 shows expected diffraction anomalies from the shallow targets. Both low resistivity and high resistivity targets were detected clearly within the upper highly resistive layers (layers 1 and 2) (note the polarity change of the reflected signal between model A and B). However, strong attenuation caused by the middle low resistivity layer makes the deep target difficult to sense for the GPR data. There are clear reflection signals from the top of the layers 2 and 3 but there is no indication of the layer 4 in GPR simulation. Combined application of the propagation (GPR) and diffusive electromagnetics (TEM and FEM) has the potential for early detection and mitigation of the drilling hazards. GPR provides fine resolution for shallow and small targets, while time domain electromagnetics can image shallow and deeper anomalies especially if the cavities are filled (low resistivity targets, model A).

Figure 9:
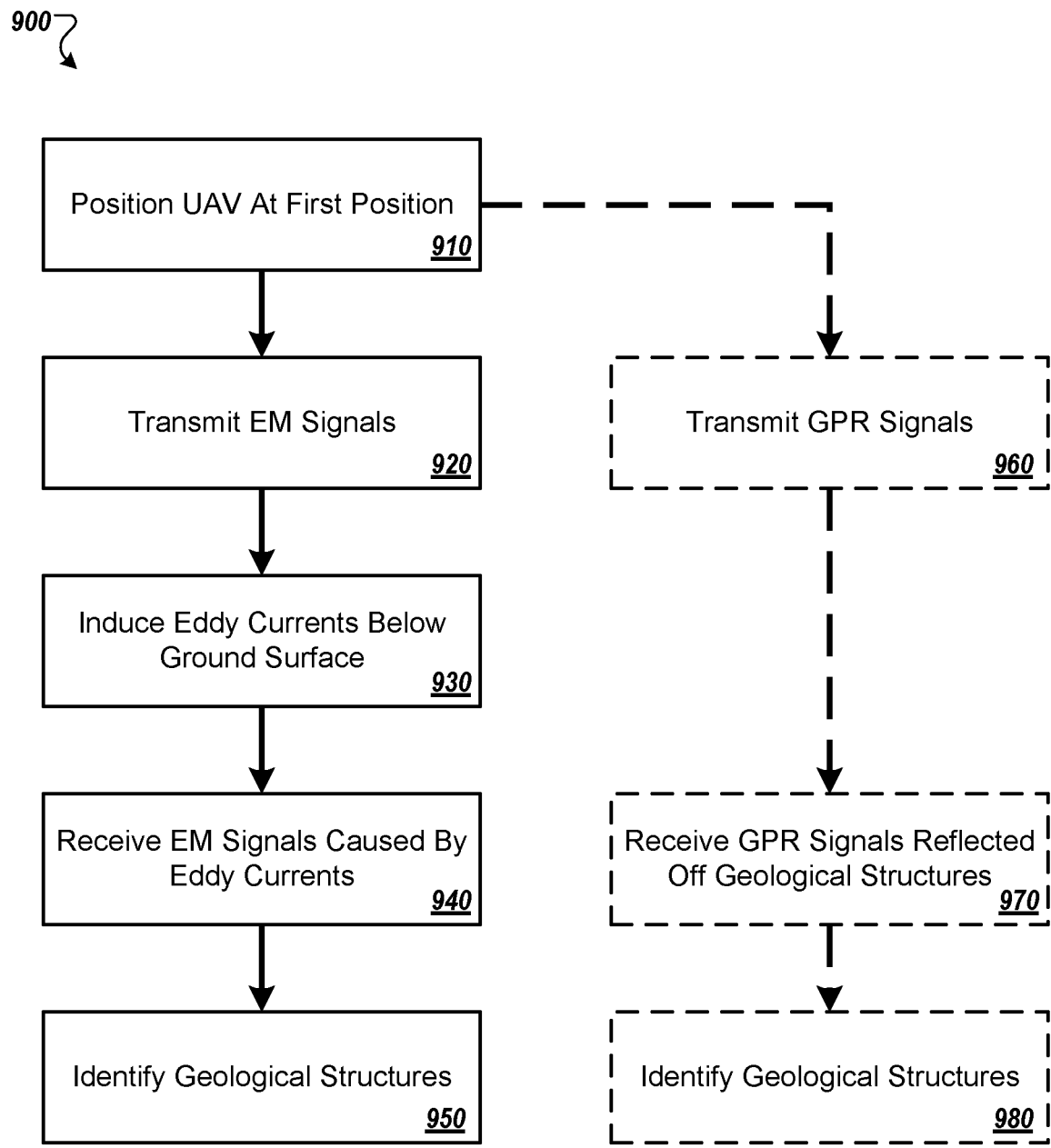
FIG. 9 is a flow diagram of an example subterranean structure detection process using an unmanned aerial vehicle.

FIG. 9 is a flow diagram of an example subterranean structure detection process 900 using an unmanned aerial vehicle. In some implementations, the process 900 can be performed entirely or in part by the example UAV 170 of FIG. 1, the example UAV 201 of FIG. 2, the example UAV 300 of FIGS. 3A-5, or the example submodules 400 of FIGS. 4A and 4B, the example submodule 501 of FIG. 5, the example UAV 600 of FIG. 6, or the example UAV 700 of FIG. 7.

At 910, an electromagnetic (EM) sensing system is positioned at a predetermined position above a ground surface by an unmanned aerial vehicle (UAV). In some embodiments, the UAV can include a first loop airframe structure having the transmitter loop antenna and defining a plane, a second loop airframe structure having the receiver loop antenna having a diameter smaller than the transmitter loop antenna and oriented substantially parallel to the plane (+/−15 degrees), a collection of vertical thrusters configured to provide lift substantially perpendicular to the plane (+/−15 degrees) and elevate the system above the ground surface, at least one lateral thruster configured to provide thrust substantially parallel to the plane (+/−15 degrees), a controller affixed configured to control the plurality of vertical thrusters and the lateral thruster, and the EM sensing system. For example, the UAV 170, including the EM detector 250, can be flown to a location above the surface 101.

In some implementations, positioning, by the unmanned aerial vehicle (UAV), the electromagnetic (EM) sensing system at the predetermined position above the ground surface can also include elevating, by a plurality of vertical thrusters, the UAV to a predetermined elevation above the ground surface, and positioning, by one or more lateral thrusters, the UAV to a predetermined lateral position above the ground surface. For example, the UAV 600 can be positioned above the location 610.

At 920, EM signals are transmitted by the EM sensing system using a first loop airframe structure comprising a transmitter loop antenna and defining a plane. In some embodiments, the first loop airframe structure can be a substantially circular airframe structure and the transmitter loop antenna can be a substantially circular loop antenna. For example, the outer airframe 330 includes the transmitter loop antenna 254. The loop of the transmitter loop antenna 254 can define a plane. The EM transmitter 252 can transmit an EM signal using the transmitter loop antenna 254. In some embodiments, the transmitter loop antenna can have a diameter of at least 5 meters. For example, the outer airframe 330 can be about 5 m to about 10 m in diameter.

At 930, eddy currents, based on the transmitted EM signals, are induced in underground geological structures. For example, the EM waves 171 can cause eddy currents in the layers 130.

At 940, secondary EM signals caused by the induced eddy currents are received by the EM sensing system using a receiver loop antenna of the UAV. For example, the receiver loop antenna 258 and the EM receiver 256 can receive signals caused by induced eddy currents.

At 950, one or more underground geological structures are identified based on the received secondary EM signals. In some implementations, the process 900 can also include identifying one or more underground geological structures as a subterranean void. For example, the voids 150, 160, and 155 can be identified as potential hazards to avoid.

The process 900 can also include repositioning, by the UAV, the EM sensing system at a predetermined second position above the ground surface, transmitting, by the EM sensing system, second EM signals using the transmitter loop antenna, inducing, based on the transmitted second EM signals, second eddy currents in underground geological structures, receiving, by the EM sensing system using the receiver loop antenna, second secondary EM signals caused by the induced second eddy currents, identifying, based on the received second secondary EM signals one or more underground geological structures. For example, the UAV 600 can be moved away from the location 610 to another location in order to collect another survey sample.

The process 900 can also include, positioning, by the UAV, a ground-penetrating radar (GPR) system at the predetermined position above the ground surface, transmitting, at 960, by the GPR system, radar signals directed toward the ground surface, receiving, at 970, by the GPR system, radar signals reflected off underground geological structures, and identifying, at 980, based on the received radar signals, one or more underground geological structures. For example, the UAV 201 also includes the GPR system 260, which can be flown to various locations to sense underground structures.

In some implementations, the first loop airframe structure can be removable from a remainder of the UAV, and the remainder of the UAV can be configured to fly while disconnected from the first loop airframe structure. For example, the submodule 501 can be disconnected from and flown independently of the UAV 500.

The process 900 can also include identifying one or more ground surface construction locations based on the identified underground geological structures. For example, the system 200, or another computerized system in communication with the system 200 can analyze data survey data collected from the work zone 100 to identify the locations of the voids 150, 160, and 155 as locations that are unfavorable for surface operations, for example by identifying such area as "restricted". Based on this analysis, the system 200 or other system can identify one or more locations in the work zone that are favorable for surface operations. For example, drilling and construction site locations can be identified automatically or semi-manually at positions on the surface 101 that show little evidence of risk from underground voids. In another example, roads or pathways can be mapped out automatically or semi-manually to avoid the voids 150, 160, and 155.

Figure 10:
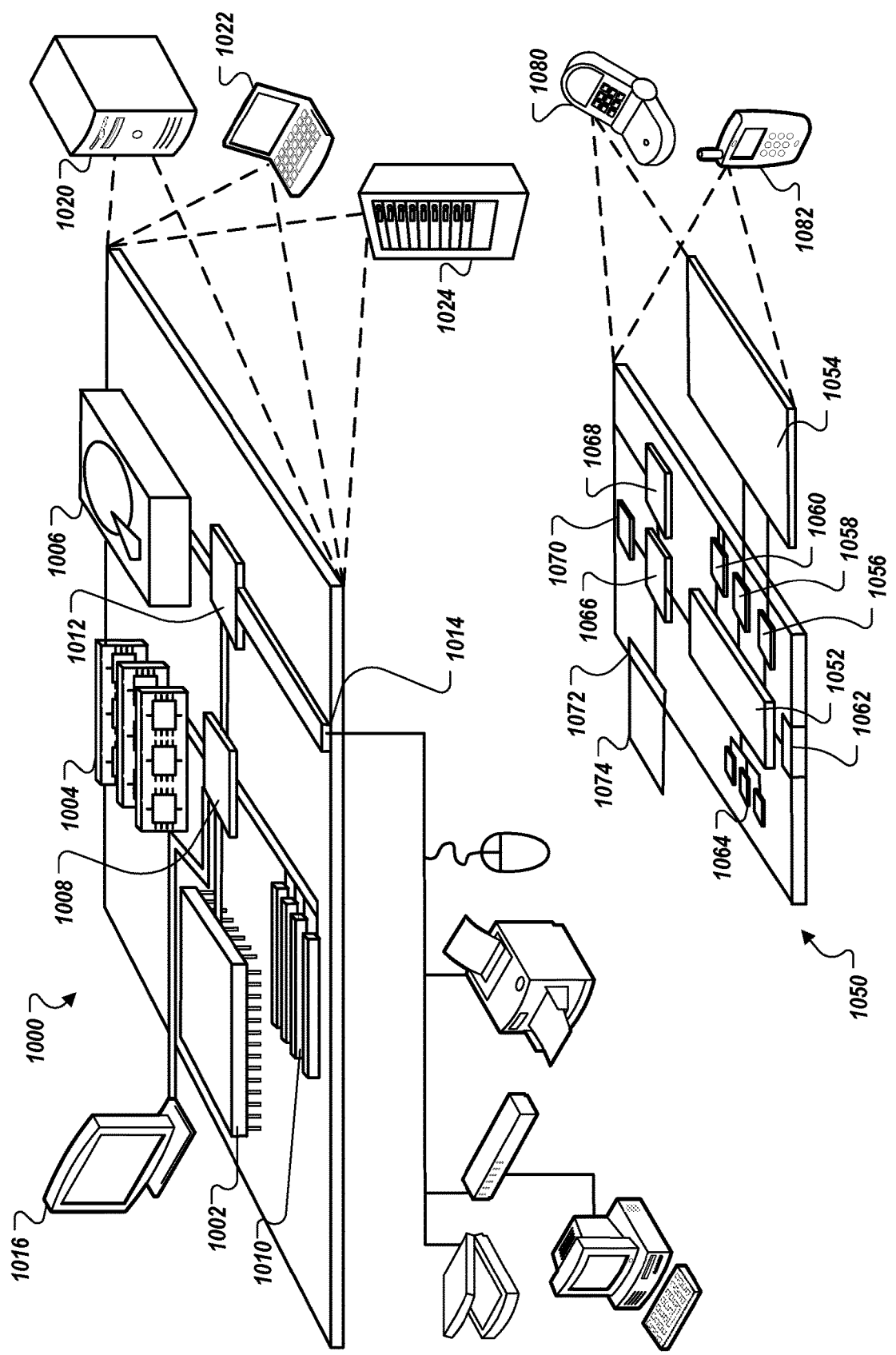
FIG. 10 is a block diagram of computing devices that may be used to implement the systems and methods described in this document.

FIG. 10 is a conceptual diagram of computing devices 1000, 1050 that may be used to implement the systems and methods described in this document, either as a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the features described or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a graphical user interface (GUI) on an external input/output device, such as display 1016 coupled to high speed interface 1008. In other implementations, multiple processors and multiple buses may be used, as appropriate, along with multiple memories and types of memory. Also, multiple computing devices 1000 may be connected, with each device providing portions of the necessary operations (for example, as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described previously. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of duties is exemplary only. In one implementation, the high-speed controller 1008 is coupled to memory 1004, display 1016 (for example, through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (for example, universal serial bus (USB), BLUETOOTH, Ethernet, wireless Ethernet) may be coupled to one or more input/output devices, such as a keyboard, a pointing device, a scanner, or a networking device such as a switch or router, for example, through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can process instructions for execution within the computing device 1050, including instructions stored in the memory 1064. The processor may also include separate analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a thin-film transistor liquid crystal display or an organic light-emitting diode display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication (for example, via a docking procedure) or for wireless communication (for example, via BLUETOOTH or other such technologies).

The memory 1064 stores information within the computing device 1050. In one implementation, the memory 1064 is a computer-readable medium. In one implementation, the memory 1064 is a volatile memory unit or units. In another implementation, the memory 1064 is a non-volatile memory unit or units. Expansion memory 1074 may also be provided and connected to device 1050 through expansion interface 1072, which may include, for example, a single inline memory module (SIMM) card interface. Such expansion memory 1074 may provide extra storage space for device 1050, or may also store applications or other information for device 1050. Specifically, expansion memory 1074 may include instructions to carry out or supplement the processes described previously, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include for example, flash memory or magnetoresistive random access memory, as subsequently discussed. In one implementation, a computer program product is tangibly embodied in an information carrier. The computer program product contains instructions that, when executed, perform one or more methods, such as those described previously. The information carrier is a computer- or machine-readable medium, such as the memory 1064, expansion memory 1074, or memory on processor 1052.

Device 1050 may communicate wirelessly through communication interface 1066, which may include digital signal processing circuitry where necessary. Communication interface 1066 may provide for communications under various modes or protocols, such as Groupe Special Mobile (GSM) voice calls, Voice Over LTE (VOLTE) calls, short messaging system (SMS), enhanced messaging service (EMS), or multimedia messaging service (MMS) messaging, code division multiple access (CDMA), time division multiple access (TDMA), personal digital cellular (PDC), wideband code division multiple access (WCDMA), CDMA2000, general packet radio services (GPRS), worldwide interoperability for microwave access (WiMAX), long term evolution (LTE), among others. Such communication may occur, for example, through radio-frequency transceiver 1068. In addition, short-range communication may occur, such as using a Bluetooth, wireless Ethernet (WiFi), or other such transceiver (not shown). In addition, GPS receiver module 1070 may provide additional wireless data to device 1050, which may be used as appropriate by applications running on device 1050.

Device 1050 may also communication audibly using audio codec 1060, which may receive spoken information from a user and convert it to usable digital information. Audio codex 1060 may likewise generate audible sound for a user, such as through a speaker, for example, in a handset of device 1050. Such sound may include sound from voice telephone calls, may include recorded sound such as voice messages, or music files, and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, or combinations thereof. These various implementations can include implementation in one or more computer programs that are executable or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural or object-oriented programming language, or in assembly/machine language. As used herein, the terms "machine-readable medium" "computer-readable medium" refers to any computer program product, apparatus or device (for example, magnetic discs, optical disks, memory, Programmable Logic Devices (PLDs)) used to provide machine instructions or data to a programmable processor, including a machine-readable medium that receives machine instructions as a machine-readable signal. The term "machine-readable signal" refers to any signal used to provide machine instructions or data to a programmable processor.

To provide for interaction with a user, the systems and techniques described here can be implemented on a computer having a display device (for example, a CRT (cathode ray tube) or LCD (liquid crystal display) monitor) for displaying information to the user and a keyboard and a pointing device (for example, a mouse or a trackball) by which the user can provide input to the computer. Other kinds of devices can be used to provide for interaction with a user as well; for example, feedback provided to the user can be any form of sensory feedback (for example, visual feedback, auditory feedback, or tactile feedback); and input from the user can be received in any form, including acoustic, speech, or tactile input.

The systems and techniques described here can be implemented in a computing system that includes a back end component (for example, as a data server), or that includes a middleware component (for example, an application server), or that includes a front end component (for example, a client computer having a graphical user interface or a Web browser through which a user can interact with an implementation of the systems and techniques described here), or any combination of such back end, middleware, or front end components. The components of the system can be interconnected by any form or medium of digital data communication (for example, a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the embodiments. For example, various forms of the flows shown in the figures and described in this document may be used, with steps re-ordered, added, or removed. Also, although several applications of the systems and methods have been described, it should be recognized that numerous other applications are contemplated. Accordingly, other embodiments are within the scope of the following claims.

What is claimed is:

1. An unmanned aerial vehicle (UAV) system comprising:
a first loop airframe structure comprising a transmitter loop antenna and defining a plane;
a second loop airframe structure comprising a receiver loop antenna having a diameter smaller than the transmitter loop antenna and oriented substantially parallel to the plane;
a plurality of vertical thrusters configured to provide lift substantially perpendicular to the plane and elevate the system above a ground surface;
at least one lateral thruster configured to provide thrust substantially parallel to the plane;
a controller affixed configured to control the plurality of vertical thrusters and the lateral thruster; and
an electromagnetic (EM) sensing system configured to transmit EM signals using the transmitter loop antenna and receive secondary electromagnetic signals of secondary eddy currents caused by interactions between the EM signals and underground geological structures.

2. The system of claim 1, wherein the EM sensing system is a time-domain and frequency electromagnetic sensing system.

3. The system of claim 1, further comprising a ground-penetrating radar (GPR) system configured to transmit radar signals directed toward the ground surface and receive radar signals reflected off underground geological structures.

4. The system of claim 1, wherein the transmitter loop antenna has a diameter of at least 5 meters.

5. The system of claim 1, wherein the receiver loop antenna has a diameter about as large as or smaller than a diameter of the transmitter loop antenna.

6. The system of claim 1, wherein the receiver loop antenna comprises induction coils housed in the second loop airframe structure.

7. The system of claim 1, wherein the first loop airframe structure is removable from a remainder of the system and the remainder of the system is configured to fly while disconnected from the first loop airframe structure.

8. The system of claim 1 wherein the first loop airframe structure is a substantially circular airframe structure and the transmitter loop antenna is a substantially circular loop antenna.

9. The system of claim 1, wherein the EM sensing system is configured to sense geological structures located at depths ranging from about 0 meters to at least 50 meters below the ground surface.

10. The system of claim 1, wherein the geological structures are located at depths ranging from about 0 meters to at least 50 meters below the ground surface.

11. The method of claim 10, further comprising identifying one or more ground surface construction locations based on the identified underground geological structures.

12. A method of detecting subterranean formations, the method comprising:
positioning, by an unmanned aerial vehicle (UAV), an electromagnetic (EM) sensing system at a predetermined position above a ground surface, wherein the UAV comprises:
a first loop airframe structure comprising the transmitter loop antenna and defining a plane;
a second loop airframe structure comprising the receiver loop antenna having a diameter smaller than the transmitter loop antenna and oriented substantially parallel to the plane;
a plurality of vertical thrusters configured to provide lift substantially perpendicular to the plane and elevate the system above the ground surface;
at least one lateral thruster configured to provide thrust substantially parallel to the plane;
a controller affixed configured to control the plurality of vertical thrusters and the lateral thruster; and
the EM sensing system;
transmitting, by the EM sensing system, EM signals using a first loop airframe structure comprising a transmitter loop antenna and defining a plane;
inducing, based on the transmitted EM signals, eddy currents in underground geological structures;
receiving, by the EM sensing system using a receiver loop antenna of the UAV, secondary EM signals caused by the induced eddy currents; and
identifying, based on the received secondary EM signals one or more underground geological structures.

13. The method of claim 12 wherein positioning, by the unmanned aerial vehicle (UAV), the electromagnetic (EM) sensing system at the predetermined position above the ground surface further comprises:
elevating, by a plurality of vertical thrusters, the UAV to a predetermined elevation above the ground surface; and
positioning, by one or more lateral thrusters, the UAV to a predetermined lateral position above the ground surface.

14. The method of claim 12, further comprising:
repositioning, by the UAV, the EM sensing system at a predetermined second position above the ground surface;
transmitting, by the EM sensing system, second EM signals using the transmitter loop antenna;
inducing, based on the transmitted second EM signals, second eddy currents in underground geological structures;
receiving, by the EM sensing system using the receiver loop antenna, second secondary EM signals caused by the induced second eddy currents; and
identifying, based on the received second secondary EM signals one or more underground geological structures.

15. The method of claim 12, further comprising:
positioning, by the UAV, a ground-penetrating radar (GPR) system at the predetermined position above the ground surface;
transmitting, by the GPR system, radar signals directed toward the ground surface;
receiving, by the GPR system, radar signals reflected off underground geological structures; and
identifying, based on the received radar signals, one or more underground geological structures.

16. The method of claim 12, wherein the transmitter loop antenna has a diameter of at least 5 meters.

17. The method of claim 12, wherein the first loop airframe structure is removable from a remainder of the UAV, and the remainder of the UAV is configured to fly while disconnected from the first loop airframe structure.

18. The method of claim 12, wherein the first loop airframe structure is a substantially circular airframe structure and the transmitter loop antenna is a substantially circular loop antenna.

19. The method of claim 12, further comprising identifying one or more underground geological structures as a subterranean void.

20. A system for detecting subterranean formations, the system comprising:
a plurality of unmanned aerial vehicles (UAVs), each UAV comprising:
a first loop airframe structure comprising a transmitter loop antenna and defining a plane;
a second loop airframe structure comprising a receiver loop antenna having a diameter smaller than the transmitter loop antenna and oriented substantially parallel to the plane;
a plurality of vertical thrusters configured to provide lift substantially perpendicular to the plane and elevate the system above a ground surface;
at least one lateral thruster configured to provide thrust substantially parallel to the plane;
a controller affixed configured to control the plurality of vertical thrusters and the lateral thruster;
an electromagnetic (EM) sensing system configured to transmit EM signals using the transmitter loop antenna and receive secondary electromagnetic signals of secondary eddy currents caused by interactions between the EM signals and underground geological structures; and
a transmitter configured to transmit signals representative of the received secondary electromagnetic signals; and,
a controller configured to coordinate movement and positioning of the plurality of UAVs within a predetermined area of the ground surface, and identify one or more underground geological structures based on secondary EM signals received by the plurality of UAVs.

* * * * *

UNITED STATES PATENT AND TRADEMARK OFFICE
CERTIFICATE OF CORRECTION

PATENT NO. : 10,845,498 B2
APPLICATION NO. : 16/182123
DATED : November 24, 2020
INVENTOR(S) : Daniele Colombo, Ersan Turkoglu and Gary W. McNeice It is certified that error appears in the above-identified patent and that said Letters Patent is hereby corrected as shown below:

Beginning in Column 19, Line 16, and ending in Column 20, Line 63, please replace Claims 11-20 with:
-- 11. A method of detecting subterranean formations, the method comprising:
positioning, by an unmanned aerial vehicle (UAV), an electromagnetic (EM) sensing system at a predetermined position above a ground surface, wherein the UAV comprises:
a first loop airframe structure comprising the transmitter loop antenna and defining a plane;
a second loop airframe structure comprising the receiver loop antenna having a diameter smaller than the transmitter loop antenna and oriented substantially parallel to the plane;
a plurality of vertical thrusters configured to provide lift substantially perpendicular to the plane and elevate the system above the ground surface;
at least one lateral thruster configured to provide thrust substantially parallel to the plane;
a controller affixed configured to control the plurality of vertical thrusters and the lateral thruster; and
the EM sensing system;
transmitting, by the EM sensing system, EM signals using a first loop airframe structure comprising a transmitter loop antenna and defining a plane;
inducing, based on the transmitted EM signals, eddy currents in underground geological structures;
receiving, by the EM sensing system using a receiver loop antenna of the UAV, secondary EM signals caused by the induced eddy currents; and
identifying, based on the received secondary EM signals one or more underground geological structures.
12. The method of claim 11 wherein positioning, by the unmanned aerial vehicle (UAV), the electromagnetic (EM) sensing system at the predetermined position above the ground surface further comprises:
elevating, by a plurality of vertical thrusters, the UAV to a predetermined elevation above the ground surface; and Signed and Sealed this
Eleventh Day of May, 2021

Drew Hirshfeld
*Performing the Functions and Duties of the
Under Secretary of Commerce for Intellectual Property and
Director of the United States Patent and Trademark Office* positioning, by one or more lateral thrusters, the UAV to a predetermined lateral position above the ground surface.

13. The method of claim 11, further comprising:

repositioning, by the UAV, the EM sensing system at a predetermined second position above the ground surface;

transmitting, by the EM sensing system, second EM signals using the transmitter loop antenna;

inducing, based on the transmitted second EM signals, second eddy currents in underground geological structures;

receiving, by the EM sensing system using the receiver loop antenna, second secondary EM signals caused by the induced second eddy currents; and identifying, based on the received second secondary EM signals one or more underground geological structures.

14. The method of claim 11, further comprising:

positioning, by the UAV, a ground-penetrating radar (GPR) system at the predetermined position above the ground surface;

transmitting, by the GPR system, radar signals directed toward the ground surface;

receiving, by the GPR system, radar signals reflected off underground geological structures; and identifying, based on the received radar signals, one or more underground geological structures.

15. The method of claim 11, wherein the transmitter loop antenna has a diameter of at least 5 meters.

16. The method of claim 11, wherein the first loop airframe structure is removable from a remainder of the UAV, and the remainder of the UAV is configured to fly while disconnected from the first loop airframe structure.

17. The method of claim 11, wherein the first loop airframe structure is a substantially circular airframe structure and the transmitter loop antenna is a substantially circular loop antenna.

18. The method of claim 11, further comprising identifying one or more underground geological structures as a subterranean void.

19. The method of claim 11, further comprising identifying one or more ground surface construction locations based on the identified underground geological structures.

20. A system for detecting subterranean formations, the system comprising:

a plurality of unmanned aerial vehicles (UAVs), each UAV comprising:

a first loop airframe structure comprising a transmitter loop antenna and defining a plane;

a second loop airframe structure comprising a receiver loop antenna having a diameter smaller than the transmitter loop antenna and oriented substantially parallel to the plane;

a plurality of vertical thrusters configured to provide lift substantially perpendicular to the plane and elevate the system above a ground surface;

at least one lateral thruster configured to provide thrust substantially parallel to the plane;

a controller affixed configured to control the plurality of vertical thrusters and the lateral thruster;

an electromagnetic (EM) sensing system configured to transmit EM signals using the transmitter loop antenna and receive secondary electromagnetic signals of secondary eddy currents caused by interactions between the EM signals and underground geological structures; and a transmitter configured to transmit signals representative of the received secondary electromagnetic signals; and, a controller configured to coordinate movement and positioning of the plurality of UAVs within a predetermined area of the ground surface, and identify one or more underground geological structures based on secondary EM signals received by the plurality of UAVs. --